United States Patent Office 2,846,459
Patented Aug. 5, 1958

2,846,459

BROMINATED ALKYL POLYSILICATES

Clarence R. Morgan, Marblehead, and Walter F. Olds, Arlington, Mass., assignors, by mesne assignments, to Minneapolis-Honeywell Regulator Company, a corporation of Delaware No Drawing. Application September 11, 1953
Serial No. 379,722

18 Claims. (Cl. 260—448.8)

The present invention relates generally to novel liquids which are useful as relatively dense damping and buoyant fluids for use with various delicate instruments. These hydraulic fluids must possess certain critical physical characteristics in order to be suitable for this purpose. Among other properties, it is imperative that these fluids (1) Have a density greater than 1.4, and in some instances as high as 2.5, (2) Have a viscosity which is independent of the rate of shearing force applied (Newtonian behavior) and which is also insensitive to wide temperature variations; this viscosity preferably lying in the range of from 100 cps. to 6,000 cps., (3) Remain in substantially liquid state under temperatures of from —65° to 165° F., (4) Be substantially non-corrosive.

A fluid having these essential characteristics is particularly necessary for use with various sensing devices wherein damping and buoyancy are required of the fluid. In this type of sensing device, a dense fluid is utilized to buoy the sensing portion of the unit in order that frictional forces on the supporting bearings may be minimized; thus the need for a fluid having these relatively high densities is realized. In connection with the viscosity characteristics, Newtonian behavior is required, thus a constant damping effect is achieved regardless of the rate of change of position or movement of the sensing device relative to the damping fluid in conjunction therewith. Further, it is desirable that the viscosity of the fluid be relatively unaffected by temperature changes, thus making operation under conditions of different or varying temperatures possible. One of the chief disadvantages of conventional fluids is their inability to remain in a liquid state under the extreme variation in temperatures (between —65° and 165° F.) at which various devices may exist or operate. Temperatures in the lower range of these limits are particularly troublesome. If the fluids crystallize, fracture or separate, there is danger of destroying portions of the delicate sensing instruments which are exposed to the fluid. For example, thin, relatively fragile leads or the like may pass through this fluid to a container which houses the sensing instrument per se. When this fluid crystallizes, shearing forces are set up along these leads, and they are sometimes ruptured or damaged to the extent that the device is rendered inoperative. This is particularly true when sensing devices are operated only intermittently, while being exposed to an ambient temperature in the lower range of the limits set forth above during idle periods, these idle periods being sufficiently long to permit fracturing to occur.

It is an object of the present invention to provide a fluid which has physical characteristics which make it particularly suitable for use as a damping and buoyant fluid.

It is a further object of the present invention to provide dense organic polysilicates which are extremely satisfactory for use as damping and buoyant fluids.

It is still a further object of the present invention to provide a novel and convenient method for producing these novel fluids.

We have discovered a class of polymeric chemical compounds possessing the critical characteristics above described, and being designated by the following repeating structural group:

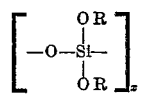

wherein "$x$" represents a number (for example, 2, 3, etc.) equal to at least 2, and wherein "R" represents similar or different bromoalkyl groups, each bromoalkyl group preferably having from two to eight carbon atoms. In straight chain or branched form, the terminal groups may, of course, be represented by OR. These compounds are designated bromoalkyl polysilicates and may be prepared by reacting an alkyl polysilicate with a bromoalcohol. An alcohol exchange reaction occurs in which the bromoalkyl group of the bromoalcohol displaces the alkyl group of the polysilicate to form the bromoalkyl polysilicate and a non-halogenated alcohol. The alkyl group of the polysilicate employed in this invention must form an alcohol which is more volatile than the bromoalcohol to permit separation of these compounds. With such reactants, removal of the relatively volatile alcohol as it forms is made possible; and as it is removed, the exchange reaction is driven to completion. Ethyl polysilicate has been found particularly suitable for use as the alkyl polysilicate in these reactions, and in particular that portion boiling between 150° C. and 350° C./0.1 mm. The bromoalcohols which may be employed in this connection include: tribromoethanol, dibromoethanol, bromoethanol, tetrabromopropanol, tribromopropanol, dibromopropanol, bromopropanol, tribromobutanol, dibromobutanol, hexabromopentanol, tribromopentanol, dibromopentanol, dibromohexanol, tetrabromoheptanol, dibromoheptanol, dibromobenzyl alcohol, pentabromobenzyl alcohol, bromocyclohexanol and dibromocyclohexanol. Other brominated alcohols having a sufficiently high density, stability and reactivity may be used if desired.

If desired, a reactant mixture including a bromoalcohol and an ordinary non-halogenated alcohol may be utilized in place of the bromoalcohol alone. For example, 2-ethyl-hexanol is a suitable alcohol for reaction with ethyl polysilicate, and particulaly so since it serves to yield a product of lower fracture point. This alcohol reacts with the alkyl polysilicate in a manner similar to that of the bromo-alcohol just described, replacing the lighter alkyl groups on the polysilicate while displacing the lower boiling alcohol therefrom. In some applications it is desirable to utilize the mixture with a non-halogenated alcohol in order that high density compositions may be prepared having extremely low fracture points.

The reaction mixture may contain from a small fraction of the theoretical amount of bromoalcohol needed for complete bromoalkylation of the polysilicate up to a substantial excess of bromoalcohol over this theoretical amount. A small amount of catalyst, such as sodium methylate ($CH_3ONa$), is preferably included in the reactant mixture as well as a small quantity of acid scavenger, such as potassium carbonate ($K_2CO_3$), which serves to neutralize any acid which may be formed. After mixing, the reaction products are heated, with stirring, and the alcohol formed during the reaction distills off. The reaction product is then purified to obtain a final product having the desired density and viscosity.

The density and viscosity of a particular bromoalkyl polysilicate fluid are not mutually dependent; that is, a relatively low density fluid having a relatively high viscosity may be obtained; or by a slightly modified procedure, a high density material having a relatively low viscosity may be produced. Similarly, within the density and viscosity ranges set forth above, high density-high viscosity compounds, and low density-low viscosity compounds may also be obtained. Thus it is seen that the density and viscosity characteristics of the compositions of our invention are very flexible.

For a fraction of alkyl polysilicate, various product densities ranging substantially up to the density of the bromoalcohol employed may be obtained, depending upon the extent of alcohol exchanged or degree of completion in the reaction. The viscosity of the final product will also vary according to the degree of alcohol exchanged and will vary further according to the particular alkyl group which remains. Density and viscosity are further dependent upon the nature of the alcohol or alcohols utilized in the preparation. A relatively dense bromoalcohol will produce a relatively dense reaction product; whereas a less dense bromoalcohol combined to the same extent will produce a less dense product. If a mixture of non-halogenated alcohol and a bromoalcohol is used, the ratio of non-halogenated alcohol to the bromoalcohol, as well as the ratio of these alcohols to the polysilicate, determine the density, viscosity and fracture point of the final product from any given fraction of alkyl polysilicate. Further, if a more viscous alkyl polysilicate is reacted with the same ratio of a non-halogenated alcohol, and bromoalcohol, a product having a higher viscosity but nearly the same density will result. The use of a mixture of alcohols, besides permitting a range of densities and viscosities, and providing a lower fracture point also allows the use of more dense but solid bromoalcohols such as tribromoethanol where a final product having an extremely high density is desired. Solid bromoalcohols may be mixed with liquid alcohols in which they are soluble, thus making these solid materials more easily handled and worked with.

In addition to the method outlined above, a second general method of preparing these brominated alkyl polysilicates is possible through the bromination of an alkenyl polysilicate. In this case, an alkyl polysilicate such as ethyl polysilicate is reacted with an unsaturated alcohol, for example, allyl alcohol; a saturated alcohol being displaced from the original alkyl polysilicate while an alkenyl polysilicate is formed. In this reaction, the saturated alcohol is removed from the mixture, preferably continuously as it forms thus driving the reaction on to completion. The alkenyl polysilicate is subsequently brominated by contact with molecular bromine in a conventional manner; thus producing the bromoalkyl polysilicate. Here, for example, density and viscosity will be determined with reference to the alkyl polysilicate used, as well as the degree of displacement or combination of the allyl alcohol in the polysilicate (see Example VI).

A third method of producing these brominated alkyl polysilicates involves an ester interchange reaction. For example, an alkyl polysilicate is reacted with a brominated ester such as dibromopropyl acetate, forming a bromoalkyl polysilicate while displacing an alkyl group from the alkyl polysilicate, the displaced alkyl group attaching to the ester radical, forming an ordinary non-halogenated ester. This newly formed ester is likewise removed as it is formed to drive the reaction toward completion. Density and viscosity variables are determined in the manner set forth in the general methods of preparation above.

The term "alkyl" as it appears throughout the specification and claims will be understood to include ordinary alkyl, cyclo-alkyl, and arylalkyl radicals.

The compounds of the present invention can be represented generally by the structural formula as previously indicated. The polymer chain of the compounds may be of a straight chain, cyclic, or branched structure; however, our investigation of the structure has indicated that it is chiefly cyclic and branched in nature.

In the general structural formula of the bromoalkyl polysilicates set forth above, "x" represents a number which defines the extent of polymerization of an individual compound. It will be understood however, that in a given batch or quantity of this material, the letter "x" will represent an average for each of the individual molecules contained in the material under consideration. The values of "x" partially determine the viscosity of any specific composition. For example, in these compositions as the value of "x" increases, the viscosity also increases, and conversely as "x" decreases, the viscosity likewise decreases. This is true of course only where other factors are constant, as where the same bromoalkyl group or non-halogenated alkyl groups are present in substantially the same relative amounts. In the compounds of the present invention, "x" is at least 2, and may range upwardly in the range of the viscosity limits set forth above, viscosity increasing as "x" increases. This upper limit varies from one compound to another depending upon the bromoalkyl group utilized in the system, and also upon the non-halogenated alcohol present, if any.

For the purpose of obtaining a specific composition which will exhibit Newtonian behavior, it is necessary that the values of "x" in the individual constituents of the specific composition are reasonably close to one another, thus, the extent and nature of the polymerization of each individual molecule must be substantially similar. In other words, for a compound represented by the general structural formula given above wherein "x" represents an average of individual "x" values for each specific molecule of the compound, it is preferable that the values of "x" for each of the individual constituent molecules in the compound be substantially the same or closely related. From the foregoing it is obvious that the alkyl polysilicate be carefully selected in order to obtain the product of the invention, since the degree and nature of polymerization of the final product are chiefly determined by the polymer characteristic of the alkyl polysilicate employed as a reactant. Selection of this reactant may be accomplished by fractional distillation of a mixture of alkyl polysilicates having differing degrees of polymerization to isolate the operable fractions having the desired degree of polymerization. An alkyl polysilicate may be represented as a polymeric compound having the following repeating unit;

wherein "R'" represents an ordinary alkyl radical and wherein "y" represents a number (for example, 2, 3, etc.) equal to at least 2. This compound may be in either linear, branched, or cyclic form. Various fractions of ethyl polysilicate have been found satisfactory for use in the present invention and in particular that fraction boiling at from 150 to 350° C./0.1 mm. Ethyl polysilicate has several advantages in that it is sufficiently reactive and its exchange product from these reactions is easily separated. Furthermore, ethyl polysilicate can be fractionated by distillation before use so as to obtain a mixture of fractions of polysilicate having constituent molecules with related degrees of polymerization. Alkyl polysilicates other than ethyl polysilicate may be used if desired, the limitations being that the alkyl groups be sufficiently reactive to be capable of being displaced by the bromoalcohol which is used in the reaction, and further that it preferably be capable of fractionation prior to use in our procedure.

Ethyl polysilicate may be conveniently synthesized according to the following procedure. An excess of ethyl alcohol solvent containing a suitable amount of water, for example about 5% as in ordinary commercial ethyl alcohol, is added to $SiCl_4$. The ratio of water to $SiCl_4$ determines the extent of polymerization, and therefore the average molecular weight or degree of polymerization of the final ethyl polysilicate, as indicated by the value of "y" above. If the reaction is attempted without water present, the resultant composition will be monomeric. On the other hand, if excessive amounts of water are utilized, the resultant product will be $SiO_2$; thus the ratio of water to $SiCl_4$ is critical. An excess of commercial ethyl alcohol over the theoretical stoichiometric proportion containing not more than 5% water is generally preferred for obtaining the correct ratio of water to $SiCl_4$, which is preferably between 5 and 10 cc. $H_2O$/100 gm. $SiCl_4$. If a lesser proportion of water is utilized, very little polymerization occurs and the resulting polysilicate will produce a brominated product having a viscosity which is impractically low. On the other hand, if too great a proportion of water is utilized, the $SiCl_4$ will be reduced to $SiO_2$ and will thus be rendered useless for the present application. This reaction is initially exothermic and proceeds spontaneously; for this reason, efficient condensation in the reflux condenser is required to prevent loss of $SiCl_4$ in the stream of HCl which is evolved. After the addition of ethyl alcohol and water to the $SiCl_4$, and following the initial exothermic reaction, the mixture is heated until the HCl evolution subsides, then the excess ethyl alcohol is removed by any convenient means such as distillation, and the ethyl polysilicate is distilled under vacuum to separate out the desired fractions as hereinbefore defined.

After obtaining the ethyl polysilicate, the bromo-alkyl polysilicate may be prepared therefrom. In general, this may be accomplished in accordance with the procedures set forth above, and more specifically described as follows. According to the preferred process, the desired fraction of ethyl polysilicate is mixed with an excess of a bromoalcohol (such as dibromopropanol), a small amount of catalyst, an acid scavenger and, optionally, a non-halogenated alcohol. A ratio of 1 part of 2-ethylhexanol to 12 parts bromoalcohol has been found satisfactory; however, other proportions may likewise be equally satisfactory. Sodium methylate or lithium chloride are satisfactory catalysts. Sodium methylate is known to react with some bromoalcohols, and this reaction with the alcohol is undesirable because of the loss in catalytic activity and the possible lowering of density of the final product. However, if the sodium methylate is added portionwise during the reaction, this difficulty is for the most part overcome. For example, the reactant products may be mixed in proportion as follows:

| Compound: | Quantity, grams |
|---|---|
| Dibromopropanol | 75 |
| Ethyl polysilicate | 22.8 |
| Poatassium carbonate | 5 |
| Sodium methylate | 2 |

The reactant mixture is heated, with stirring, and the ethyl alcohol is distilled off as it is formed by the displacement reaction up to a pot temperature which is generally slightly below the decomposition point of the bromoalcohol (180° C. for dibromopropanol). The reacting materials are held at the permissible maximum temperature until the evolution of ethyl alcohol subsides, which may run from 1 to 5 hours. The crude product is filtered and stripped of excess reactants, if any, under high vacuum and may be further purified for example, by decolorization. Thus a light-colored fluid product having a desired density and viscosity is obtained.

Although the stoichiometry of the reaction between the bromoalcohol and the alkyl polysilicate is not well defined because of the uncertain size and structure of the alkyl polysilicate polymer, the reaction is regarded as an equilibrium process. This suggests that an increase in the quantity of bromoalcohol employed in the reaction should facilitate product formation; as evidenced in practice by increased displacement of the alcohol from the alkyl polysilicate.

In addition to this form of preparation, a slightly modified process of preparation may be followed wherein an alkyl polysilicate such as ethyl polysilicate is reacted with an unsaturated alcohol which is higher boiling than the alcohol to be displaced from the polysilicate, for example, allyl alcohol, in the presence of a catalyst. After mixing the reactant mixture is heated to about 100° C. for about 8 hours and the displaced alcohol removed by conventional means. The polysilicate obtained is then placed in contact with molecular bromine, the unsaturated alkyl portions of the polysilicate taking up the bromine at the double bonds to provide a saturated bromoalkyl polysilicate compound. The crude product thus obtained is then purified and a product having the desired density and viscosity is then obtained.

In addition to the general methods of preparation as hereinbefore described, specific examples of preparation follow.

*Example I*

A commercially available ethyl polysilicate sold by Carbide and Carbon Chemicals Company, New York, New York, under the trade name "Ethyl Silicate 40" was fractionated under high vacuum, and 22.8 g. of the fraction boiling at 210–225° C./0.1 mm. was mixed with 9.8 grams of 2-ethylhexanol and 55 grams of 2,3-dibromopropanol-1 in a 100 ml. two-neck flask containing a thermometer well and a simple stillhead. Half a gram of sodium methylate was sprinkled into the stirred mixture which was heated to distill off the ethyl alcohol formed. When the pot temperature had reached 163° C. an additional 0.3 g. of sodium methylate was added. This addition was repeated at a pot temperature of 187° C. When 11.5 g. of ethyl alcohol had been collected, the reaction mixture remaining was filtered under anhydrous conditions and stripped of excess alcohol to a pot temperature of 200° C./0.1 mm. The product remaining had a density of 1.64 g./ml., a viscosity of 155 cps. at 165° F., a pour point of −5° F., and a fracture point of −100° F.

*Example II*

A mixture of ethyl polysilicates was synthesized by the dropwise addition of 200 ml. of an ordinary commercial ethyl alcohol containing 5% water to 400 grams of silicon tetrachloride with constant stirring and ice bath cooling to conduct away exothermic heat. The HCl evolved was allowed to escape through a cold water reflux condenser and drying tube. The mixture was allowed to stand overnight and an additional 400 ml. of ethyl alcohol containing 5% water was added with cooling and stirring over a period of 1½ hours. The mixture was refluxed for three hours until the evolution of HCl subsided. About 400 ml. of excess ethyl alcohol was distilled off and the product distilled under low pressure. A total of 165 grams of ethyl polysilicate distilled from 100° C./0.6 mm. to 305° C./0.3 mm. and 22.8 grams of the fraction boiling at 185–215° C./0.2 mm. was mixed with 5 grams of 2-ethylhexanol and 60 grams of 2,3-dibromopropanol-1. Half a gram of sodium methylate was sprinkled into the stirred mixture which was heated to remove ethyl alcohol up to a pot temperature of 190° C. After 14.5 ml. of ethyl alcohol distilled the crude black product was taken up in dry benzene, decolorized with carbon black, filtered and stripped of excess alcohol to a pot temperature of 200° C./0.1 mm. The dark red liquid had a density of 1.85 g./ml. and a viscosity of 4730 cps. at 165° F. The pour point was below room temperature.

*Example III*

A batch of ethyl polysilicate was synthesized as in Example II and 22.8 g. of the fraction boiling from 160 to 240° C./0.2 mm. was mixed with 10.2 grams of 2-ethylhexanol and 66.6 grams of tribromoethanol and heated without catalyst to 180° C. until 14.5 ml. of ethyl alcohol were distilled off. The product was decolorized, filtered and stripped of excess alcohol. It had a density of 1.72 g./ml. and a viscosity of 1200 cps. at 165° F., a pour point of 30° F., and a fracture point of −65° F.

*Example IV*

A 22.8 gram fraction of synthesized ethyl polysilicate boiling from 150 to 160° C./0.3–0.4 mm. was mixed with 75 grams of distilled, neutral 2,3-dibromopropanol and 5 grams of granular, anhydrous potassium carbonate. Half a gram of sodium methylate was sprinkled into the stirred mixture which was then heated to 185° C., ethyl alcohol being distilled off. The mixture was cooled at 30° C. and one and a half grams of sodium methylate added. The mixture was again heated to 170° C. and held there for several hours until 14 ml. of ethyl alcohol was collected. The crude product was filtered and stripped to a pot temperature of 230° C./2 mm. The resulting clear, light yellow fluid had a density of 1.88 g./ml. and a viscosity of 240 cps. at 160° F.

*Example V*

A blend of several ethyl polysilicate fractions (B. 150–250° C./.3 mm.) having a refractive index of 1.4046 at 23° C., weighing 1155 grams, was mixed with 3800 grams of distilled, neutral 2,3-dibromopropanol and 250 grams of granular, anhydrous potassium carbonate. Fifty grams of sodium methylate was sprinkled into the mixture with constant stirring. Heat was then applied. Ethyl alcohol began to distill off at a pot temperature of 105° C. and continued up to a pot temperature of 190° C. The mixture was cooled to 30° C. and an additional fifty grams of sodium methylate was sprinkled in with stirring and heating again resumed. The pot was heated up to 190° C. and held there until 690 ml. of ethyl alcohol had been collected. Excess dibromopropanol (1550 grams) was stripped off (B. 100° C./1 mm.) up to a pot temperature of 190° C./1 mm. with occasional stirring. One liter of carbon tetrachloride was mixed with the crude product which was filtered by suction. The carbon tetrachloride solvent was stripped from the product up to a pot temperature of 190° C./1 mm. with occasional stirring, yielding 2210 grams of clear brown liquid having a density of 1.875 g./ml. and a viscosity of 385 cps. at 165° F., and did not fracture when cooled to −93° F.

*Example VI*

Ethyl polysilicate was synthesized as in Example II and 19.3 grams distilling around 180° C./0.2 mm. ($n_D^{23}$ 1.4010) was mixed with 19.65 g. of redistilled allyl alcohol and one drop of silicon tetrachloride catalyst. The mixture was heated with stirring to 100° C. for about 8 hours during which time about 13 ml. of ethyl alcohol distilled off through a Vigreaux column. The residue was then distilled and 13.2 g., B. 165–205°/.3–.5 mm. of allyl polysilicate was obtained. This liquid was dissolved in 75 ml. of carbon tetrachloride, and 5.3 ml. of bromine dissolved in 10 ml. of CCl₄ was added at −3 to −2° C. over a three hour period with stirring. The carbon tetrachloride and excess bromine were removed by distillation up to a pot temperature of 140° C. at reduced pressure. The product had a density of 1.84 g./ml. and a viscosity of 130 cps. at 165° F.

*Example VII*

A mixture of 22.8 g. ethyl polysilicate boiling around 160° C./0.2 mm. ($n_D^{23}$ 1.3990), 85 g. tribromoethanol, 5 g. potassium carbonate and 1 gram of lithium chloride catalyst was heated with stirring to a pot temperature of 190° C. The ethyl alcohol displaced was distilled off and 14 ml. of distillate collected. The mixture was cooled, 25 ml. of carbon tetrachloride solvent added and the product was filtered in a dry atmosphere. The CCl₄ and excess tribromoethanol were stripped up to a pot temperature of 190° C. at 4 mm. Hg pressure. A very dark fluid was obtained having a density of 2.32 g./ml. and a viscosity of 5000 cps. at 165° F. The fluid was pourable at room temperature.

In each of these examples, a final product is achieved which has Newtonian behavior and which is substantially non-corrosive, thus being suitable for use as damping and buoyant fluids.

Although various specific embodiments of the invention herein have been disclosed, it will be understood that there is no intention to limit the scope of the present invention to these specific embodiments or uses alone, since they are disclosed here for purposes of illustration only. Many details of composition and procedure may be varied without departing from the principles of this invention. It is, therefore, not our purpose to limit the patent granted on this application otherwise then necessitated by the scope of the appended claims.

We claim as our invention:

1. A hydraulic damping fluid for use in sensing instruments consisting essentially of a polymeric composition of matter having the structural formula

wherein "x" is at least 2 and wherein "R" represents a bromoalkyl radical having from 2 to 8 carbon atoms, said composition being relatively insensitive to extreme variations in temperature having a specific gravity substantially between 1.4 and 2.5 and having Newtonian viscosity behavior.

2. The composition of claim 1 being further characterized in that "R" represents a dibromopropyl group.

3. The composition of claim 1 being further characterized in that "R" represents a tribromoethyl group.

4. The composition of claim 1 being further characterized in that "R" represents a tribromobutyl group.

5. The composition of claim 1 being further characterized in that "R" represents a bromoarylalkyl group.

6. The composition of claim 1 being further characterized in that "R" represents a bromocycloalkyl group.

7. A hydraulic damping fluid for use in sensing instruments characterized by relative insensitivity to extreme variations in temperature, a viscosity of from 100 to 6000 centipoises and a specific gravity of from 1.4 to 2.5, said fluid consisting essentially of a polymeric compound having the structural formula

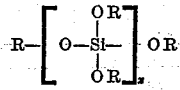

wherein "x" equals at least 2 and "R" is a bromoalkyl radical.

8. A hydraulic damping fluid for use in sensing instruments characterized by relative insensitivity to extreme variations in temperature, a viscosity of from 100 to 6000 centipoises, a specific gravity of from 1.4 to 2.5, and Newtonian viscosity behavior, said fluid consisting essentially of a polymeric compound having the structural formula

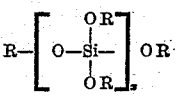

wherein "x" equals at least 2 and "R" is a bromoalkyl radical, and wherein there is substantial similarity between the values of "x" in the constituent molecules included in said compound.

9. A polymeric composition of matter for use as a delicate hydraulic damping fluid having a density substantially in the range of from 1.4 to 2.5, having a viscosity which is relatively insensitive to temperature changes, which exhibits Newtonian type behavior, and which ranges from 100 to 6000 centipoises, said composition consisting essentially of compounds represented by the structural formula

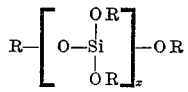

wherein "R" represents a bromoalkyl group having from 2 to 8 carbon atoms and wherein "$x$" represents a value of at least 2, said compounds having a substantial similarity in values of "$x$."

10. A hydraulic damping fluid for use in sensing instruments characterized by relative insensitivity to extreme variations in temperature, a viscosity of from 100 to 6000 centipoises and a specific gravity of from 1.4 to 2.5, said fluid consisting essentially of a polymeric compound having the structural formula

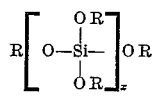

wherein "$x$" equals at least 2 and "R" is a dibromopropyl radical.

11. A polymeric composition of matter consisting essentially of a material having the structural formula

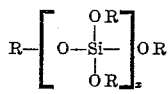

wherein "$x$" is at least 2, "R" represents a bromoalkyl group, and wherein "R'" represents a non-halogenated alkyl group, said composition having a density of between 1.4 and 2.5.

12. The method of producing a bromoalkyl polysilicate hydraulic damping fluid having a density of at least 1.4 and having a viscosity which is relatively insensitive to temperature variations and which exhibits Newtonian behavior from a polysilicate having the structural formula

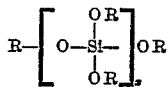

wherein "$x$" represents a positive number greater than 1, and where "R" is a hydrocarbon radical selected from the group consisting of alkyl and alkenyl radicals, said method including the steps of reacting said polymeric compound together with a bromine containing reactant until a substantial portion of hydrocarbon radicals are converted to bromoalkyl radicals.

13. The method of producing a relatively high density bromoalkyl polysilicate hydraulic damping fluid having Newtonian viscosity characteristics which comprises the steps of making a reactant mixture including an alkyl ester of polysilicic acid and a bromoalkyl alcohol having a density of over 1.4 and heating said mixture until alcoholysis is substantially complete, said ester of polysilicic acid having a selected composition in which the degree of polymerization among the various constituent molecules in said alkyl ester is substantially similar.

14. The process of producing a relatively dense bromoalkyl polysilicate damping fluid having the structural formula

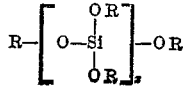

wherein "R" represents a bromoalkyl group and wherein "$x$" represents a value of at least 2 which comprises making a mixture of reactants including an alkyl polysilicate and a bromoalkyl alcohol having a density greater than 1.4 and isolating the bromoalkyl polysilicate from the products of reaction, said alkyl polysilicate having a selected composition in which the degree of polymerization among the various constituent molecules therein is substantially similar.

15. The process of producing a bromoalkyl polysilicate which comprises mixing reactant products including ethyl polysilicate boiling between 150–350° C./0.1 mm. and 2,3-dibromopropanol heating said reactants to substantially 180° C. and removing the ethyl alcohol resulting from the reaction.

16. The method of producing a bromoalkyl polysilicate hydraulic damping fluid which comprises the steps of making a reactant mixture including an alkyl ester of polysilicic acid, a bromoalkyl alcohol having a density of over 1.4, and a non-halogenated alkyl alcohol, and heating said mixture until alcoholysis is substantially complete.

17. The method of producing a bromoalkyl polysilicate damping fluid which is characterized by a viscosity which is relatively insensitive to temperature variations and which exhibits Newtonian behavior, said fluid having a density of from 1.4 to 2.5 and being represented by the structural formula

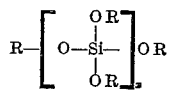

wherein "$x$" is at least 2, and wherein "R" represents a bromoalkyl group, said process comprising the steps of brominating an alkenyl polysilicate having at least one unsaturated alkyl group thereon.

18. A process for preparing dense organic polysilicates having a predetermined density of between 1.4 and 2.5 and having a viscosity which is relatively insensitive to temperature variations and which exhibits Newtonian behavior, said polysilicates having the structural formula

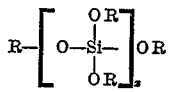

wherein "$x$" is at least 2, and wherein "R" represents a bromoalkyl group, said process including a reacting bromine with an alkenyl polysilicate having the structural formula

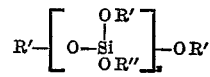

wherein "$x$" is at least 2, and wherein R' is a hydrocarbon radical selected from the class consisting of alkyl and alkenyl radicals and wherein R" is an alkenyl radical.

References Cited in the file of this patent

UNITED STATES PATENTS

| | | |
|---|---|---|
| 2,242,400 | Loane | May 20, 1941 |
| 2,317,891 | Dennisson | Apr. 27, 1943 |
| 2,375,007 | Larsen | May 1, 1945 |
| 2,625,520 | Rust | Jan. 13, 1953 |
| 2,641,581 | Da Fano | June 9, 1953 |
| 2,650,934 | Rust | Sept. 1, 1953 |
| 2,711,418 | Kather | June 21, 1955 |